A. L. McGREGOR.
AUTOMOBILE BUMPER.
APPLICATION FILED MAR. 24, 1920.
1,359,184. Patented Nov. 16, 1920.
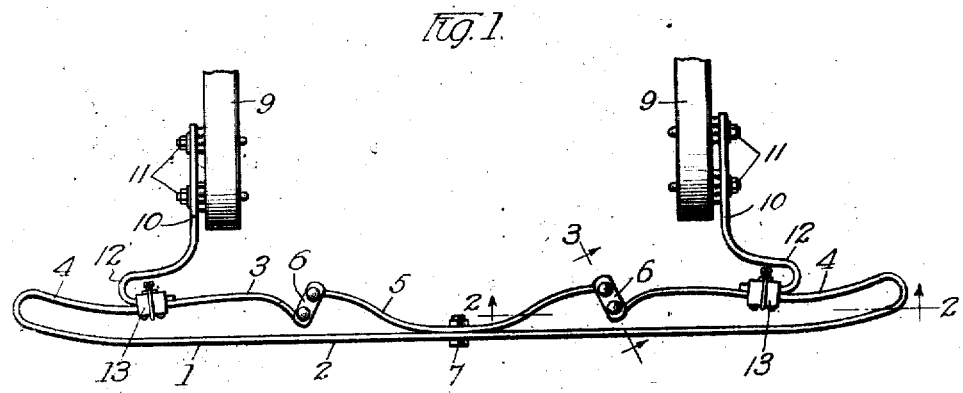
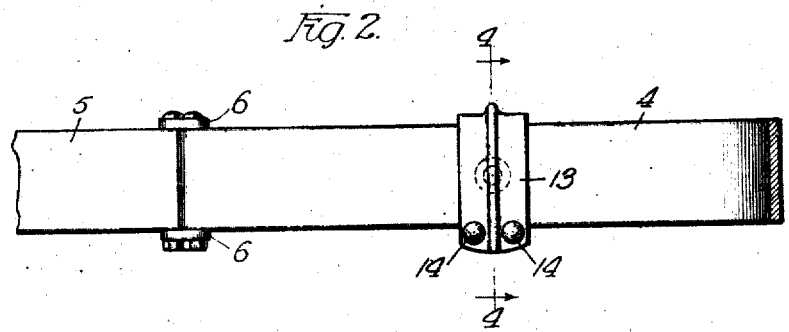
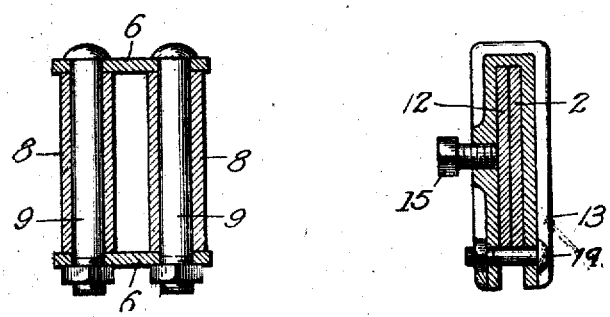
Inventor
Allan L. McGregor

UNITED STATES PATENT OFFICE.

ALLAN L. McGREGOR, OF CHICAGO, ILLINOIS.

AUTOMOBILE-BUMPER.

1,359,184.　　Specification of Letters Patent.　　Patented Nov. 16, 1920.

Application filed March 24, 1920. Serial No. 368,459.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers and particularly to devices of the character described which are adapted for attachment to the front end of motor vehicles for the purpose of protecting the vehicle from collision with other vehicles or objects with which the vehicle may accidentally collide.

The object of this invention is to provide a construction for a bumper in which a greater degree of strength is afforded, and more especially to provide a construction which will render the bumper capable of resisting the effects of impact without permanent distortion of the bumper itself. A further object of the invention is to provide a bumper structure whereby the impact may be uniformly distributed throughout the bumper, by including an equalizing member. A further feature of the construction is the introduction of an adjustable connection between the bumper and the vehicle in order to provide for various distances between the frame members of the vehicle, to which the bumper is attached.

The features embodied in the invention are hereinafter more fully set forth and in connection with the accompanying drawings in which—

Figure 1 is a top plan view of the bumper attached to the vehicle frame,

Fig. 2 is an enlarged detail view taken on line 2, 2 of Fig. 1,

Fig. 3 is an enlarged view in vertical section through one of the shackles, as taken on line 3, 3 of Fig. 1, and Fig. 4 is an enlarged view in cross-section taken on line 4, 4 of Fig. 2.

A preferred form of the bumper embodying the features of the invention comprises a bumper bar 1 consisting of a continuous front impact member 2 and a rear or secondary member 3 comprising the end portions 4, 4 of the front impact member 2 and an intermediate equalizing bar 5 connected at its ends to the free ends of the end portions 4, 4 by means of shackles 6, 6 and itself connected at its central point to the front impact member 2.

The impact bar 1 is preferably formed of bars of resilient metal so arranged as to be yieldable in a horizontal direction and comparatively nonyieldable in a vertical direction. As before suggested, the end portions 4, 4 of the front impact member are bent rearwardly and inwardly substantially parallel to the front impact member and form U-shaped extremities. The end portions 4, 4 terminate at their free ends a distance inwardly from the extremities of the bumper bar, substantially equal to one-third the length of the bar and the intermediate equalizing bar 5 being likewise of a length substantially equal to one-third the total length of the bumper bar, the same, as before suggested, being rigidly connected to the front impact member 2 at a point midway of its length by means of a bolt 7. The equalizing bar 5 is of curvilinear conformation sloping laterally and rearwardly from its central point of connection and terminating at its free end rearwardly at a distance from the adjacent free ends of the end portions 4, 4, the extremities of said end portions 4, 4 being bent or curved in a direction toward the front impact member 2. The adjacent ends of the equalizing bar 5 and the end portions 4, 4 are joined together by means of the shackles which are arranged substantially at right angles to the front impact member 2. As shown in Fig. 3, the ends of the bars connected by the shackles are rolled or turned to provide eyes 8, 8 through which extend bolts 9, 9 which also engage bolt holes formed at the ends of the shackles, which are in reality plates or links located above and below the bars connected thereby. By reason of this arrangement the bars are loosely connected by the shackles 6, 6 and a considerable degree of relative movement is permitted between the equalizing bar 5 and the end portions 4, 4.

The bumper bar is adapted to be attached in the usual manner to the forward end of the vehicle, and more particularly to the forward ends of the frame members 9, 9 of the vehicle. As a means of attaching the bumper bar connecting bar members 10, 10 are employed which extend generally parallel to the frame members 9, 9 and are connected thereto at their rear ends by means of suitable clamping bolts 11, 11. The forward ends of the connecting bars 10, 10 terminate beyond the ends of the frame members 9, 9 in the form of U-shaped extremities 12, 12 opening inwardly toward each other and having their free ends adapted to lie flatwise against the surface of the end portions 4, 4 of the bumper bar at a point substantially midway between the ends of said end portions 4, 4.

As a means for connecting the bumper bar 1 to the connecting bars 10, 10, clamping members 13, 13 are employed which comprise U-shaped members adapted to embrace the parts of the connected bars, clamping them together by pressure exerted through a bolt 14 (Fig. 4) extending through the lower ends of the clamping member 13. A set screw 15 is mounted in the clamping member 13 and acts to secure the clamping member in place.

It is obvious that the connecting bars 10, 10 may engage the bumper bar at different points along the end sections 4, 4, thus permitting the bumper bar to be adjustably connected to different makes of vehicles, in which considerable variation exists in the distance separating the frame members 9, 9, and likewise the connecting bars 10, 10. In other words, the clamping members 13, 13 may be adjusted along the end portions 4, 4 and connecting the connecting bars 10, 10 thereto in a number of adjusted positions by simply loosening the bolt 14 and set screw 15.

As hereinbefore indicated, the member 5 acts as an equalizing bar, that is, it acts to distribute the impact received at any point along the impact member 2 equally throughout the entire bumper structure. This is possible by reason of the rigid connection between the equalizing bar 5 and the front impact member 2 and the shackle or link connection between the ends of the equalizing bar 5 and the adjacent end portions 4, 4, thereby permitting a considerable degree of relative movement between the parts as would result from the horizontal yielding thereof upon impact, and, because of the resilient nature of the several members, they would be restored to their normal conformation immediately after impact. The end portions 4, 4, together with the equalizing bar 5 provides a reinforcing member for the front impact member 2 thereby absorbing a portion of the shock of impact and manifestly lessening the shock that would ultimately be transmitted to the vehicle frame. By reason of the formation of the equalizing bar 5 and its connection between the front impact member 2 and the end portions 4, 4, it assumes the function of a spring acting to oppose the force of impact in such a way as to not only equalize the shock but to restore the members to their normal position.

The features embodied in my invention are hereinafter more specifically pointed out in the appended claims:

I claim as my invention:

1. In an automobile bumper, the combination of an impact bar having its ends bent into U-form, a resilient member connected to said impact bar intermediate its ends and terminating adjacent the free ends thereof, and shackles connecting the adjacent ends of said impact bar and resilient member.

2. In an automobile bumper, the combination of an impact bar having its end portions bent in U-shape, its free ends terminating inwardly beyond the point of attachment with the vehicle, and a resilient member joined intermediate its ends to the central portion of said impact bar, and shackles connecting the adjacent ends of said impact bar and resilient member.

3. In an automobile bumper, the combination of a resilient impact bar having its end portions bent in U-form and its free ends terminating inwardly beyond the points of attachment, an equalizing bar connecting the free ends of the impact bar and portions, and shackles intermediate the connected ends of said bars and normally arranged transversely thereto.

4. In an automobile bumper, the combination of an impact bar having its ends bent rearwardly and inwardly in U-shape, its free ends terminating inwardly beyond the points of attachment, an equalizing bar joined to said impact bar between its ends and terminating in horizontally offset relation to the free ends of said impact bar, and shackles connecting the ends of said impact and equalizing bars.

5. In an automobile bumper, the combination of a resilient impact bar having its end portions bent in U-form and its free ends terminating inwardly beyond the points of attachment with a vehicle frame, an equalizing bar connecting the free ends of the impact bar, and connecting bars adapted for attachment with the vehicle frame and adjustable connection with said end portions of the impact bar.

In witness whereof I hereunto subscribe my name this 20th day of March, A. D. 1920.

ALLAN L. McGREGOR.